United States Patent [19]

Dale et al.

[11] Patent Number: 4,809,759
[45] Date of Patent: Mar. 7, 1989

[54] TIRE CHANGER SAFETY ARM

[75] Inventors: James L. Dale; Bryce L. Mannen; Raymond Titsworth, all of Conway, Ark.

[73] Assignee: FMC Corporation, Chicago, Ill.

[21] Appl. No.: 10,079

[22] Filed: Feb. 2, 1987

[51] Int. Cl.$^4$ .................................................. B60C 25/00
[52] U.S. Cl. ................................................................ 157/1.1
[58] Field of Search ................... 157/1, 1.1, 1.17, 1.22, 157/1.24, 1.26, 1.28, 14–21; 141/38, 97; 206/304; 152/415

[56] References Cited

U.S. PATENT DOCUMENTS

| | | |
|---|---|---|
| 3,552,469 | 1/1971 | Corless .................................. 157/1.1 |
| 3,675,705 | 7/1972 | Corless .................................. 157/1.1 |
| 3,677,320 | 7/1972 | Corless .................................. 157/1.1 |
| 3,736,975 | 6/1973 | Strang et al. ......................... 157/1.1 |
| 3,785,424 | 1/1974 | Rishovd ................................ 157/1.1 |
| 3,805,871 | 4/1974 | Corless .................................. 157/1.1 |
| 4,057,093 | 11/1977 | Joines ...................................... 157/1 |
| 4,263,958 | 4/1981 | Corless ..................................... 157/1 |
| 4,335,772 | 6/1982 | Bubick et al. ....................... 157/1.28 |

FOREIGN PATENT DOCUMENTS 1524514 9/1978 United Kingdom ..................... 157/1

OTHER PUBLICATIONS

Two page brochure CP/Coats Air-Flate Rim Clamp Tire Changer RC-10A.

Primary Examiner—Debra Meislin
Attorney, Agent, or Firm—H. M. Stanley; R. C. Kamp; R. B. Megley

[57] ABSTRACT

A tire changer has a base on which is mounted a rim and tire assembly support table upon which tires are inflated through an air inflation hose. A rigid arm-like member is pivotally attached to the base of the tire changer in a position so that it may be pivoted between a safety position overlying the support table and a rim/tire assembly thereon and a stowed position away from the support table. In one embodiment the rigid arm pivots from an overhead position to the safety position and in another embodiment the rigid arm pivots from a lateral position to the safety position. The rigid arm carries the air inflation hose with a short length of the hose extending therefrom, so the arm must overlie the support table for the hose to reach the inflation valve on a tire supported on the table.

9 Claims, 3 Drawing Sheets

U.S. Patent    Mar. 7, 1989    Sheet 1 of 3    4,809,759
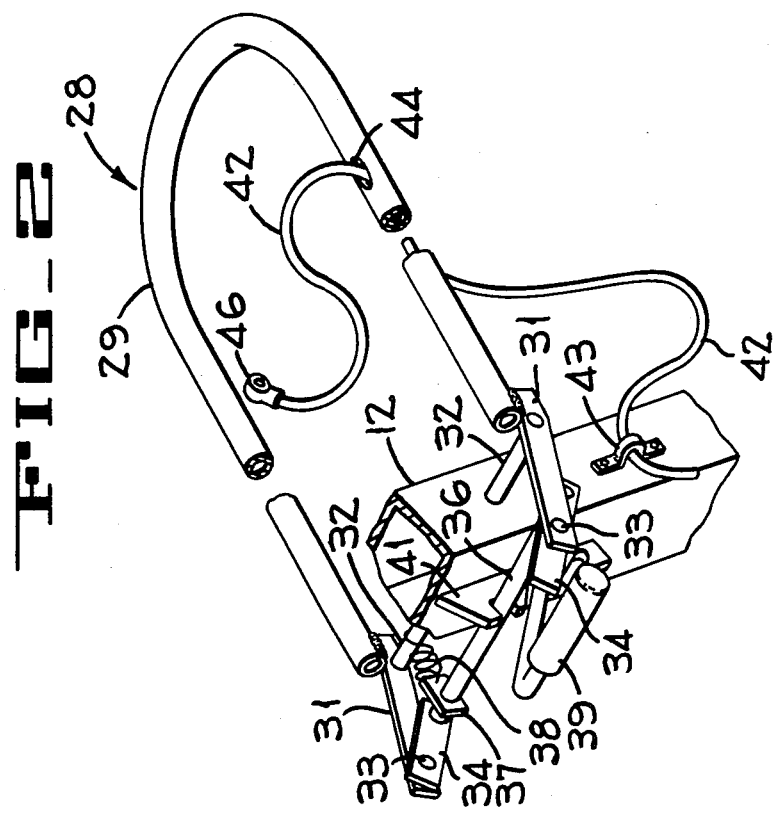
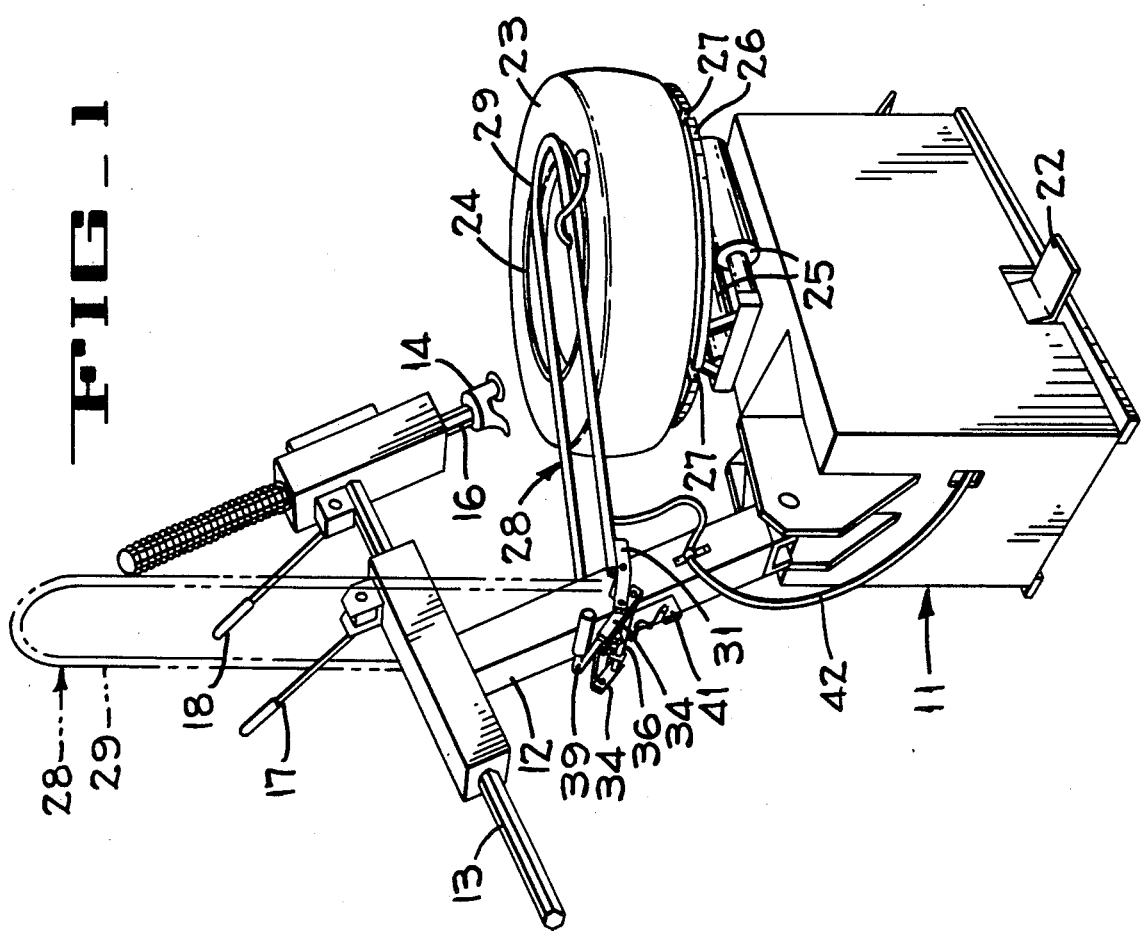

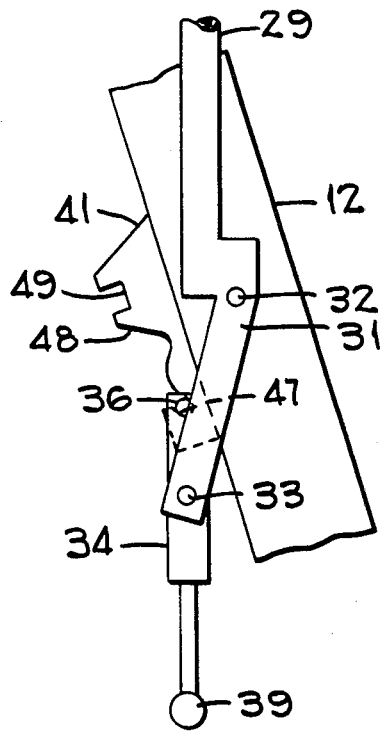
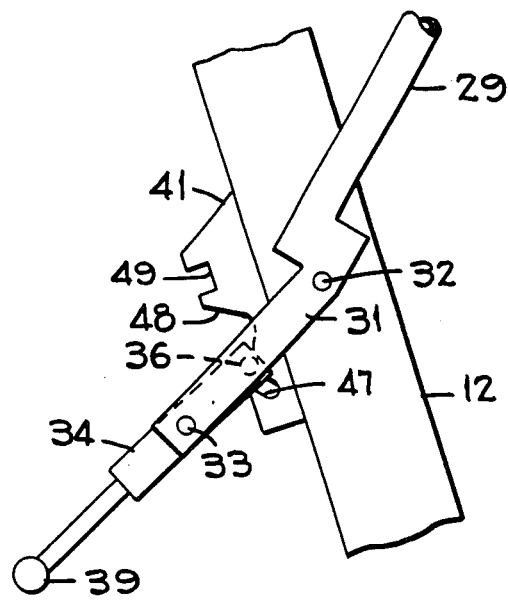
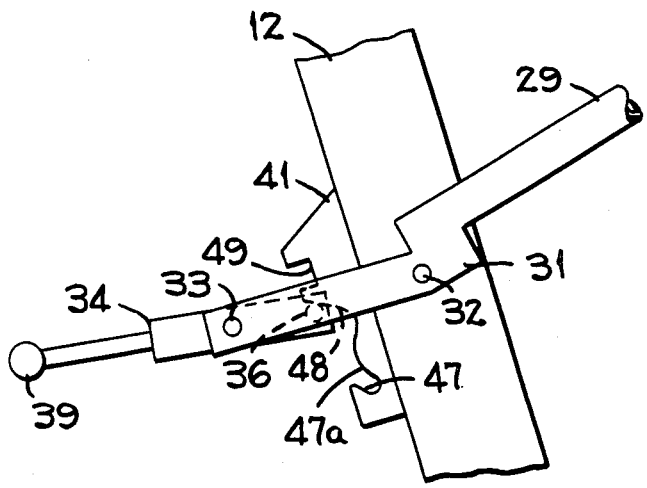

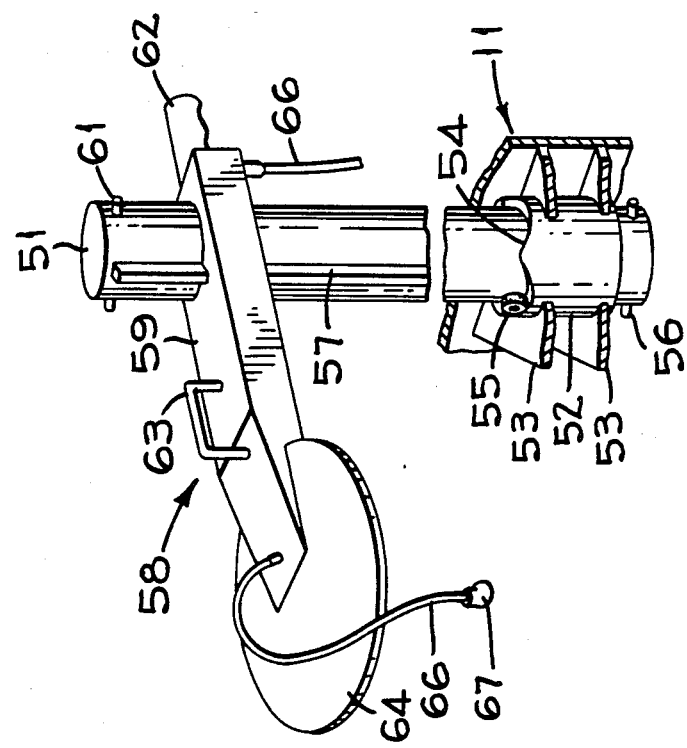
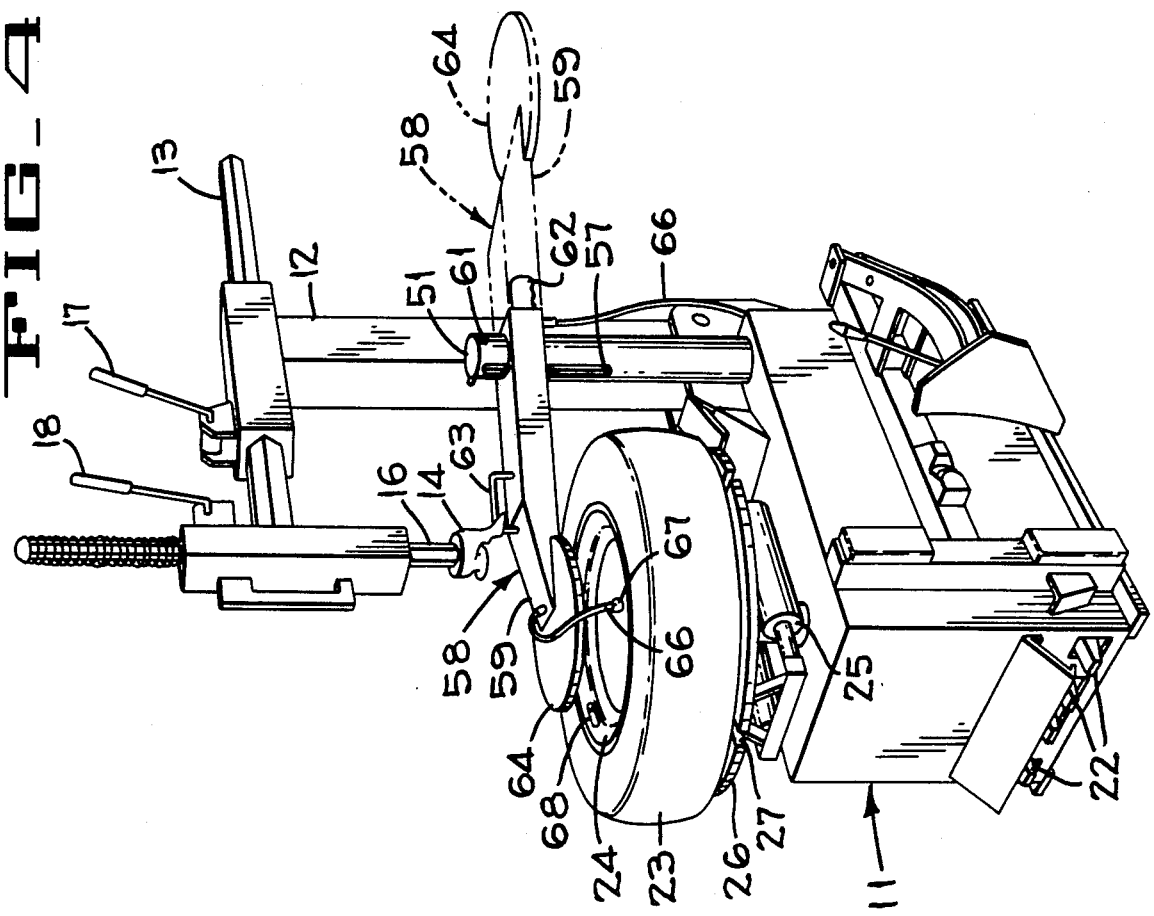

4,809,759

TIRE CHANGER SAFETY ARM

SUMMARY OF THE INVENTION

Rim and tire assembly retention apparatus is disclosed for a tire changing machine having a rim and tire assembly support table and a tire inflator. The apparatus includes a rigid member pivotally attached to the tire changing machine and movable between a retention position overlying the support table and a remote position removed therefrom. Means is provided for inhibiting pivotal motion of the rigid member when in the retention position.

In another aspect of the invention rim and tire assembly retention apparatus is disclosed for a tire changing machine having a rim and tire assembly support table and a tire inflator, which includes a rigid member pivotally attached to the tire changing machine for movement between a retention position overlying the table and a remote position. An air conduit has an air chuck mounted on the free end thereof which is adapted to couple with a tire inflation valve. Means is provided for routing the air conduit through the rigid member so that a limited length of the air conduit extends from the rigid member. The limited length of conduit requires the rigid member to be in the retention position for the air chuck to reach the tire inflation valve of a tire located on the support table.

BRIEF DESCRIPTION OF THE DRAWINGS

FIG. 1 is a perspective view of a tire changer utilizing the present invention.

FIG. 2 is a perspective view of the retention arm of the present invention.

FIGS. 3A–3D depict the lock and release mechanism for one embodiment of the present invention.

FIG. 4 is a perspective view of a tire changer utilizing another embodiment of the present invention.

FIG. 5 is a partial perspective view of the embodiment of FIG. 4.

DESCRIPTION OF THE PREFERRED EMBODIMENT

The invention disclosed herein will be described primarily in conjunction with a rotating table type tire changer for mounting and demounting tires onto and from vehicle wheel rims. The apparatus and method described herein is also useful on a tire changer having a stationary table for receiving the rim of a vehicle wheel. A tire changer of the first mentioned type is shown in FIG. 1 having a base shown generally at 11 with a tower 12 mounted at one end of the base. The tower is disposed to rock into the position shown in FIG. 1 as well as into a position wherein the tower is in a substantially vertical position. An arm 13 is disposed to slide through an upper portion of the tower 12 to dispose a tire mount-demount head 14 in a position overlying the junction of a vehicle wheel rim and a tire bead when the tower 12 is in the substantially vertical position. A vertical adjust arm 16 is adjustable to place the mount-demount head in proper position relative to the tire bead and the wheel rim to mount or demount the tire therefrom as desired. The horizontal and vertical adjust arms 13 and 16 are capable of being locked in position by means of locking mechanisms manually actuated by locking handles 17 and 18. Actuation of the locking handles spaces the mount-demount head 14 appropriately from the vehicle rim to avoid damage to the rim as is well known in this art.

A foot pedal shown generally at 22 is disposed at the side of the base 11 for actuation by an operator to provide tire inflation air at an appropriate pressure for a tire and rim being assembled on the tire changer.

A tire 23 is shown disposed on a rim 24 lying on top of a rotating table 26 on the tire changer of FIG. 1. The table is rotated by means of an electrical motor and interconnecting gearing (not shown) which is known in this art and is supported within the base 11. The table in this type of tire changer has a number (in most cases 4) of radially moving jaws not shown which are disposed to move in grooves 27 shown intercepting the edge of the table 26. The jaws clamp either the inside or the outside of the rim 24. The jaws on the tire changer of FIG. 1 are caused to move radially by actuation of two pneumatic cylinders 25 positioned beneath the table 26 and above the base 11 which, through a system of simple levers, cause the jaws to undergo their aforedescribed radial movement. In this known manner the tire 23 and rim 24 assembly is firmly positioned on top of the table 26. However, in a tire changer where the wheel and rim assembly is captured to prevent radial motion on a tire changer table, motion of the tire and wheel assembly, or parts thereof, axially away from the table is not restrained to any appreciable degree. Moreover, it is common to relax the grip of the jaws on the rim prior to tire inflation. Therefore, if a tire mounted on the table is overinflated to the point of explosion, the tire rim assembly will move violently upward off of the table 26 endangering any persons situated in the near vicinity.

The structure which arrests the violent movement of an exploding tire and rim assembly on the support table 26 is seen generally in FIG. 1 as the rigid member or arm 28. The member 28 is shown in solid lines in FIG. 1 cantilevered from the tower 12 in a safety position overlying the support table 26 and therefore in a position to absorb any force resulting from an explosion of a tire 23 from a rim 24. Since the tire changer has several functions besides inflating tires on rims, the arm assembly 28 must be removed from the overlying or "safety" position during the performance of those other functions. The arm is movable in a pivotal fashion about a horizontally disposed axis through pivot points to be described in greater detail hereinafter. The stowed or out of the way position for the arm 28 is shown in phantom lines in FIG., 1 wherein the arm extends generally vertically upward from the arm pivots.

FIG. 2 shows the detailed construction of the rigid member or arm assembly 28 which includes a "U" shaped rigid bar 29, which may be made of steel tubing as shown. An extension member 31 is fixed to each free end of the "U" shaped bar, as by welding. A pivot pin 32 extends through the tower 12 on the tire changer and through holes formed in the extension members 31, whereby the rigid arm 29 may be rotated about the axis of the pivot pin 32. The pivot axis extends horizontally in this embodiment.

At the distal ends of the extension members 31, pivot pins 33 are affixed. A pair of lock support levers 34 are mounted to rotate relative to the extension members in a pivotal fashion on the pivot pins 33, and a lock bar 36 is fixed to and extends between the ends of the lock support levers remote from the pivot pins 33. A plate 37 having a hole therethrough receiving the lock bar is positioned for rotation on the lock bar. A spring 38 engages one side of the plate 37 and extends to an exposed portion of the pivot pin 32, being secured thereto by any convenient means such as a loop or hook at the end of the spring 38. One of the lock support levers 34 has an "L" shaped handle 39 fixed thereto, so that the lock bar may be manipulated rotationally about the pivot pins 33.

As seen in FIG. 2 a lock plate 41 is fixed to the back side of the tower 12, as by welding, and serves to provide lock notches and cam face guidance for causing the lock bar 36 to assume various positions, in a manner to be hereinafter described. Also shown in FIG. 2 as well as in FIG. 1 is a tire inflation hose 42 which is coupled to a tire inflation pressure source and is shown secured at an appropriate point along the length of the hose by a strain relief clamp 43 to the tower 12. The hose is directed through an opening on the underside of the rigid "U" shaped arm 29 into the interior of the arm and outwardly toward the bend in the arm. Another hole 44 is formed in the top of the arm near the bottom of the "U" which provides egress for the inflation hose 42 at a position in the vicinity overlying the support table 26 when the arm is in the "safety" position. The hose 42 is terminated in an air chuck 46 which is adapted to be coupled to inflation valves on tires 23. The hose is used in conjunction with a bead seater ring, which may be similar to that found in U.S. Pat. No. 3,805,871, to inflate tires on rims. The hose extending from the hole 44 to the air chuck 46 has a predetermined limited length such that the hose may reach a tire inflation valve located on the table 26 only when the "U" shaped rigid member 29 is in the overlying or safety position shown in solid lines in FIG. 1. The hose cannot reach the valve on a tire supported on the table 26 when the rigid member 29 is in the stowed position (shown in phantom lines in FIG. 1) or in most intermediate positions. Moreover, the weight of the member 29 is such as to cause the arm assembly 28 to fall into the "safety" position if it lies above the table 26 in an intermediate unlocked position. The cantilevered arm assembly 28 is then locked in the "safety" position by the interaction of the lock bar 36 and the lock plate 41 in a manner to be hereinafter described.

Referring now to FIGS. 3A through 3D, the interaction between lock bar 36 and the lock plate 41 to secure the rigid arm assembly 28 in the out-of-the-way or remote position shown in phantom lines in FIG. 1 (vertically disposed) and in the "safety" position overlying the table 26 (shown in solid lines in FIG. 1) will now be discussed. FIG. 3A shows the contour of the lock plate 41 wherein the lock bar 36 is disposed in the remote lock notch 47 on the lock plate. In this position, with the tower 12 swung to a rearward position as shown, the "U" shaped rigid member 29 is substantially vertically disposed. If a force was exerted on the rigid member 29 to cause it to rotate clockwise about the pivot pin 32, the lock bar 36 would be forced into a lip 47a in the remote lock notch 47 so that such clockwise rotation of the member 29 is prevented. In this fashion inadvertent forces applied to the rigid member will not cause it to depart from its locked out-of-the-way or remote position. If it is desired to unlock the rigid member from the remote position, handle 39 is grasped and force applied to move the handle in a counterclockwise direction about the pivot pins 33 while simultaneously applying a slight force to the rigid member 29 to cause it to move clockwise about the pivot pin 32. These two concurrent torques cause the lock bar 36 to escape both the lip 47a, with slight rotation about the pivot pins 33, and the lock/notch 47, so that thereafter the member 29 is rotatable about the pivot pin 32 in a clockwise direction toward the "safety" position. The force exerted on handle 39 to turn it in a counterclockwise direction about the pivot pins 33 is such as to oppose the torque about pivot pins 33 which results from the force exerted by the spring 38 of FIG. 2. The spring generated torque has the effect of retaining the lock bar 36 in the lock notch 47 so that it, will not be inadvertently knocked out of the lock notch by casual contact which would otherwise move the handle 39 in a counterclockwise direction about its pivot pins 33. The remote lock notch 47 and the lip 47a on the lock notch are indicated only in FIGS. 3C and 3D where they are most clearly discernible.

FIG. 3B shows the lock bar immediately after it has escaped from notch 47 and has passed the lip 47a. The rigid rm 29 is shown in an intermediate position approximately 60° above horizontal. The spring 38 (shown in FIG. 2) exerts a force on the lock bar 36 through the plate 37 to draw the lock bar toward a cam surface 48 on the lock plate 41.

The lock bar is disposed on the cam surface after it escapes the lock notch by further rotation of the rigid arm 29 and the force applied by spring 38. If the arm rotation is continued in a clockwise direction about pivot pin 32, the lock bar will be brought into contact with the relatively steep portion of the cam face 48 just below a safety lock notch 49 as depicted in FIG. 3C. Spring 38 (FIG. 2) keeps the lock bar 36 against the cam face 48 while motion of the bar along the cam face causes the lock bar to rotate about the pivot pins 33 to bring the handle 39 from the downwardly extending position seen in FIG. 3B to the upwardly extending position seen in FIG. 3D. The action of the rotating rigid arm 29 about the pivot pin 32 thereby causes the lock support levers 34 to be positioned so that the spring 38 can urge the lock bar 36 into the safety lock notch 49 as seen in FIG. 3D. The "U" shaped rigid member 29 is then locked in the "safety" position overlying the support table 26 and any rim and tire assembly 24/23 which may be supported thereon.

To release the rigid member 29 from the safety position shown in FIG. 3D, the handle 39 is moved to rotate in a clockwise direction about the pivot pins 33 to remove the lock bar 36 from the safety lock notch 49 against the spring force exerted by the spring 38 (FIG. 2), and simultaneously the rigid member 29 is moved upwardly in a counterclockwise direction about the pivot pin 32. The rigid member 29 passes through the positions shown in FIGS. 3C and 3B successively until it reaches the vertically disposed position seen in FIG. 3A, wherein the spring 38 positively seats the lock bar 36 within the remote lock notch 47. The lock bar is held securely within the remote lock notch until release is accomplished by means of simultaneous torques being applied about the pivot pins 32 and 33 as hereinbefore described.

Another embodiment of the present invention is shown in FIG. 4 wherein the same tire changer machine as described for the embodiment of FIG. 1 is shown. The embodiment of FIG. 4 includes a vertically disposed post 51 which extends upwardly through the upper surface of the base 11 and which is supported in a collar 52 located beneath the upper surface. The collar is fixed, as by welding to a pair of spaced triangular gussets 53 which are in turn fixed, as by welding, to the inner surfaces of the side and end panels forming the corner of the base 11 where the post 51 is situated. The collar has a cam surface 54 on one half of the upwardly disposed end thereof which has two "valleys" formed therein about 160 to 180 degrees apart. A raised portion of the cam surface 54 is located between the "valleys".

The post 51 has a roller type cam follower 55 which is attached to the surface of the post as shown in FIG. 5 and which may rotate about the cylindrical axis of the roller. The post is therefore rotatable about its cylindrical axis so that the cam follower 55 may rest in either one "valley" on the cam surface 54 or the other, passing over the raised portion of the cam in transit. A retainer pin 56 is shown extending through the bottom of the post 51 to prevent the post from being lifted upwardly out of the collar 52, but allowing the post enough vertical motion to provide for excursion of the follower 55 on the cam surface 54.

The vertical post 51 has a key 57 running in an axial direction along the surface of the post. A keyed arm assembly 58 is shown having a rigid arm 59 with an opening therethrough formed to accept passage of the post 51. A keyway is formed in the opening for the purpose of receiving the key 57. Consequently, the arm 59 may be moved axially along the post 51 in a vertical direction as seen in drawing FIGS. 4 and 5 but is prevented from moving rotationally relative to the post. A top retaining pin 61 is shown extending through the post 51 to prevent the arm 59 from being drawn off the top of the post.

The rigid arm 59 has a rear handle 62 and a top loop handle 63 attached thereto in the position shown in FIGS. 4 and 5. The arm also has attached thereto a platen type structure 64 at one end opposite the handle 62. A tire inflation hose 66, coupled to a pressurized tire inflation air source, is shown introduced into the interior of rigid arm 59 near the handle 62. The air hose is directed through the arm 59 emerging therefrom near the end of the arm to which the platen 64 is attached. A limited length of the hose 66 extends from the arm 59 and is terminated in an air chuck 67. The length of the hose extending from the rigid arm 59 is sufficient to reach an air inflation valve 68 on a rim/tire assembly 24/23 resting on the support table 26 when the rigid arm 59 is disposed in a "safety" position overlying the support table as seen in FIG. 4. The air chuck 67 will not reach the air inflation valve 68 when the retaining arm assembly 58 is swung into the remote or out-of-the-way position shown in phantom lines in FIG. 4.

The embodiment of FIGS. 4 and 5 may be seen to be stabilized in either the "safety" position or the remote position by the interaction of the roller type cam 55 and the cam surface 54. With the post 51 rotated to the position shown in FIG. 4, and the roller 55 disposed on the cam 54 as shown, the arm assembly 58 is located in the "safety" position as shown in solid lines in FIG. 4. The arm assembly is positioned vertically on the post 51 by grasping the handle 62 and the loop handle 63 simultaneously. It may be seen that the arm assembly 58 is cantilevered on the post 51, thereby creating a binding effect between the opening in the arm 59 and the surface of the post. The binding effect between the arm and the post may be temporarily eliminated by lifting on the loop handle 63 and manually adjusting the height of the arm 59 on the post while the moment of the arm 59 about an axis extending radially through the post is thus neutralized. When the arm assembly 58 is moved to a position adjacent to and immediately above a tire and rim assembly on the support table 26, the handles may be released and the arm assembly will be maintained in the "safety" position by the return of the binding effect or friction between the aperture in the arm 59 and the surface of the post 51.

It may be seen in FIG. 4 that any force applied to the platen at the end of the arm 59 by an exploding wheel/rim assembly will create a much higher "binding effect" between the arm 59 and the post 51 by virtue of the higher moment created about the diameter of the post. The rigid arm and the platen on the end of the arm assembly 58 will therefore absorb any forces due to such an explosion on the support table 26. Since the tire 23 cannot be inflated unless the arm assembly 58 is in the "safety" position, as hereinbefore described, the operator of the tire changing machine is protected from inadvertent inflation without the arm assembly in place to absorb any explosive forces. It is readily apparent from drawing FIGS. 4 and 5 that the arm assembly 58 may be rotated toward the out-of-the-way or remote position shown in phantom lines in FIG. 4 by merely applying enough torque manually to the arm 59 to cause roller 55 to pass over the raised portion between the "valleys" on the cam surface 54 so that the roller subsequently falls into the valley substantially 180° away from the position of the roller shown in FIG. 5.

Although the best mode contemplated for carrying out the present invention has been herein shown and described, it will be apparent that modification and variation may be made without departing from what is regarded to be the subject matter of the invention.

What is claimed is:

1. Rim and tire assembly retention apparatus for a tire changing machine having a framework for mounting a rim and tire assembly support table and a tire inflator, comprising a rigid member pivotally attached to the tire changing machine and being movable between a retention position overlying the support table and a remote position removed therefrom, and locking means disposed between said rigid member and the tire changer framework, said locking means further comprising a lock member, and locking cam means in contact with and interacting with said lock member for holding said lock member in both said remote and retention positions, one of said lock member and locking cam means being attached to said framework and the other being attached to and movable with said rigid member and thereby said rigid member alternately in said retention and remote positions.

2. Retention apparatus as in claim 1 wherein said locking cam means comprises cam face means having cam detents therein for retaining said lock member in each of said retention and remote positions, and wherein said lock member comprises release means for selectively displacing said lock member from said cam detents, thereby freeing said rigid member from either said retention or remote position.

3. Retention apparatus as in claim 1 comprising an air conduit having a free end extending a predetermined length from said rigid member and being coupled to a tire inflation air supply at the other end, an air chuck adapted to couple with a tire inflation valve mounted on said free end, so that said rigid member must be in said retention position for said air chuck to reach the tire inflation valve on a rim and tire assembly on the support table.

4. Retention apparatus as in claim 1 comprising means for pivotally attaching said rigid member having a substantially horizontal pivot axis.

5. Retention apparatus as in claim 1 wherein said locking cam means comprises a lock plate having a lock notch therein for receiving and interacting with said lock member, and means for urging said lock member into said lock notch when said rigid member is in said retention position.

6. Retention apparatus as in claim 1 wherein said lock member is attached to and movable with said rigid member, and wherein said locking cam means is coupled to the framework.

7. Rim and tire assembly retention apparatus for a tire changing machine having a rim/tire assembly support table and a tire inflator, comprising
a rigid member pivotally attached to the tire hanging machine for movement between a retention position overlying the table and a remote position,
a lock member attached to and movable with said rigid member,
locking cam means interacting with said lock member in both said remote and retention positions, one of said lock member and locking cam means being attached to said framework and the other being attached to and movable with said rigid member for holding said lock member alternately in positions whereby said rigid member is secured in said remote and retention positions,
an air conduit having a free end,
an air chuck mounted on said free end and being adapted to couple with a tire inflation valve, and
means for providing for extension of a limited length of said air conduit free end from said rigid member, whereby said rigid member must be in said retention position for said air chuck to reach the tire inflation valve of a tire on the support table.

8. Retention apparatus as in claim 7 wherein said rigid member comprises a "U" shaped member, and means for pivotally attaching said "U"0 shaped member to the tire changing machine at the open end of said "U".

9. Retention apparatus as in claim 7 wherein said locking cam means comprises cam face means having cam detents therein for retaining said lock member in each of said retention and remote positions, and wherein said lock member comprises release means for selectively displacing said lock member from said cam detents, thereby freeing said rigid member from either said retention or remote position.

* * * * *